(12) United States Patent
Liu et al.

(10) Patent No.: US 6,853,671 B2
(45) Date of Patent: *Feb. 8, 2005

(54) METHOD AND APPARATUS FOR TUNING A LASER WITH A BRAGG GRATING IN A SEMICONDUCTOR SUBSTRATE

(75) Inventors: Ansheng Liu, Cupertino, CA (US); Mario J. Paniccia, Santa Clara, CA (US); Remus Nicolaescu, San Jose, CA (US); Richard Jones, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 09/967,445

(22) Filed: Sep. 28, 2001

(65) Prior Publication Data

US 2002/0197013 A1 Dec. 26, 2002

Related U.S. Application Data

(63) Continuation-in-part of application No. 09/881,218, filed on Jun. 13, 2001.

(51) Int. Cl.[7] .................................................. H01S 3/08
(52) U.S. Cl. ........................................ 372/102; 372/99
(58) Field of Search .......................... 372/20, 26, 50, 372/92, 99, 102

(56) References Cited

U.S. PATENT DOCUMENTS

| 4,518,219 A | 5/1985 | Leonberger et al. |
| 4,984,894 A | 1/1991 | Kondo |
| 5,082,342 A | 1/1992 | Wight et al. |

(List continued on next page.)

FOREIGN PATENT DOCUMENTS

EP  1094574 A1  4/2001

OTHER PUBLICATIONS

Willner, A.E., "Tunable Compensation of Channel Degrading Effects Using Nonlinearly Chirped Passive Fiber Bragg Gratings", *IEEE Journal of Selected Topics in Quantum Electronics*, vol. 5, No. 5, pp. 1298–1311, Sep./Oct. 1999.

Giles, C.R., "Lightwave Applications of Fiber Bragg Gratings", *Journal of Lightwave Technology*, vol. 15, No. 8, pp. 1391–1404, Aug. 1997.

Sugden, K., "Fabrication and Characterization of Bandpass Filters Based on Concatenated Chirped Fiber Gratings", *Journal of Lightwave Technology*, vol. 15, No. 8, pp. 1424–1432, Aug. 1997.

(List continued on next page.)

*Primary Examiner*—Minsun Oh Harvey
*Assistant Examiner*—Phillip Nguyen
(74) *Attorney, Agent, or Firm*—Blakley, Sokoloff, Taylor & Zafman LLP (57) ABSTRACT

A semiconductor-based laser tuning method and apparatus. In one aspect of the present invention, an apparatus according to an embodiment of the present invention includes a gain medium disposed in a semiconductor substrate. A laser cavity is disposed in the semiconductor substrate and is optically coupled to the gain medium. A first reflector defines one end of the laser cavity. The first reflector includes a first tunable Bragg grating disposed in the semiconductor substrate. The first tunable Bragg grating includes a first plurality of silicon and polysilicon interfaces along the semiconductor substrate such that there is a first plurality of perturbations of a refractive index along the Bragg grating. The first tunable Bragg grating selectively reflects light having a tunable center wavelength so as to emit light through stimulated emission having the tunable center wavelength in the laser cavity. A second reflector defines an other end of the laser cavity.

33 Claims, 9 Drawing Sheets

U.S. PATENT DOCUMENTS

| | | | | |
|---|---|---|---|---|
| 5,379,318 | A | * | 1/1995 | Weber .......................... 372/96 |
| 5,446,809 | A | | 8/1995 | Fritz et al. |
| 5,467,732 | A | | 11/1995 | Donnelly, Jr. et al. |
| RE35,516 | E | | 5/1997 | Henry et al. |
| 6,011,881 | A | | 1/2000 | Moslehi et al. |
| 6,014,480 | A | * | 1/2000 | Baney ........................... 385/24 |
| 6,061,481 | A | | 5/2000 | Heidrich et al. |
| 6,172,791 | B1 | | 1/2001 | Gill et al. |
| 6,221,565 | B1 | | 4/2001 | Jain et al. |
| 6,268,953 | B1 | * | 7/2001 | Maloney ..................... 359/321 |
| 6,330,255 | B1 | | 12/2001 | Hung |
| 6,363,202 | B1 | | 3/2002 | Goodfellow |
| 6,438,277 | B1 | * | 8/2002 | Eggleton et al. ............... 385/1 |
| 6,480,513 | B1 | * | 11/2002 | Kapany et al. ............... 372/20 |
| 6,600,864 | B2 | | 7/2003 | Samara-Rubio et al. |
| 6,628,450 | B2 | * | 9/2003 | Samara-Rubio ............. 359/279 |
| 6,661,937 | B2 | | 12/2003 | Sobiski et al. |
| 6,748,138 | B2 | * | 6/2004 | Wang et al. ................... 385/37 |
| 2002/0113966 | A1 | | 8/2002 | Shchegrov et al. |
| 2002/0197011 | A1 | | 12/2002 | Liu et al. |
| 2003/0013438 | A1 | * | 1/2003 | Darby ......................... 455/419 |
| 2003/0021305 | A1 | | 1/2003 | Lundqvist |
| 2003/0025976 | A1 | | 2/2003 | Wipiejewski |
| 2003/0086655 | A1 | | 5/2003 | Deacon |
| 2003/0091088 | A1 | | 5/2003 | Sahara et al. |
| 2003/0099018 | A1 | | 5/2003 | Singh et al. |

OTHER PUBLICATIONS

Erdogan, T., "Fiber Grating Spectra", *Journal of Lightwave Technology*, vol. 15, No. 8, pp. 1277–1294, Aug. 1997.

Hill, K. O., "Fiber Bragg Grating Technology Fundamentals and Overview", *Journal of Lightwave Technology*, vol. 15, No. 8, pp. 1263–1276, Aug. 1997.

Studenkov, P.V., "Asymmetric Twin–Waveguide 1.55–$\mu$m Wavelength Laser with a Distributed Bragg Reflector", *IEEE Photonics Technology Letters*, vol. 12, No. 5, pp. 468–470, May 2000.

"Encyclopedia.com–Results for laser", http://www.encyclopedia.com/articles/07237.html.

"Encyclopedia.com–Results for laser: Coherent Light and Its Emission in Lasers", http://www.encyclopedia.com/articles/07237.html.

"Encyclopedia.com–Results for laser: Characteristics of Lasers", http://www.encyclopedia.com/articles/07237.html.

"Encyclopedia.com–Results for laser: Applications of Lasers", http://www.encyclopedia.com/articles/07237.html.

"Laser", Encarta Encyclopedia, http://encarta.msn.com/Concise.asp?z+1&pg+2&ti+761578658.

"Howstuffworks "How Lasers Work"", http://www.howstuffworks.com/laser.htm.

"The Basics of an Atom", Howstuffworks "How Lasers Work", http://www.howstuffworks.com/laser1.htm.

"The Laser/Atom Connection", Howstuffworks "How Lasers Work", http://www.howstuffworks.com/laser2.htm.

"Three–Level Laser", Howstuffworks "How Lasers Work", http://www.howstuffworks.com/laser3.htm.

"Types of Lasers", Howstuffworks "How Lasers Work", http://www.howstuffworks.com/laser4.htm.

"Laser Classifications", Howstuffworks "How Lasers Work", http://www.howstuffworks.com/laser5.htm.

"Links", Howstuffworks "How Lasers Work", http://www.howstuffworks.com/laser6.htm.

Maluf, N., "Lasers: A Tutorial", *New Focus*, Opticon 2001, San Jose, CA., pp1–48.

Erdogan, T., "Fiber Grating Spectra", *Journal of Lightwave Technology*, vol. 15, No. 8, pp. 1277–1294, Aug. 1997.

"Encyclopedia.com–Results for laser", http://www.encyclopedia.com/articles/07237.html.

"Encyclopedia.com–Results for laser: Coherent Light and Its Emission in Lasers", http://www.encyclopedia.com/articles/07237.html.

"Encyclopedia.com–Results for laser: Characteristics of Lasers", http://www.encyclopedia.com/articles/07237.html.

"Encyclopedia.com–Results for laser: Applications of Lasers", http://www.encyclopedia.com/articles/07237.html.

"Laser", Encarta Encyclopedia, http://encarta.msn.com/Concise.asp?z+1&pg+2&ti+761578658.

"Howstuffworks "How Lasers Work"", http://www.howstuffworks.com/laser.htm.

"The Basics of an Atom", Howstuffworks "How Lasers Work", http://www.howstuffworks.com/laser1.htm.

"The Laser/Atom Connection", Howstuffworks "How Lasers Work", http://www.howstuffworks.com/laser2.htm.

"Three–Level Laser", Howstuffworks "How Lasers Work", http://www.howstuffworks.com/laser3.htm.

"Types of Lasers", Howstuffworks "How Lasers Work", http://www.howstuffworks.com/laser4.htm.

"Laser Classifications", Howstuffworks "How Lasers Work", http://www.howstuffworks.com/laser5.htm.

"Links", Howstuffworks "How Lasers Work", http://www.howstuffworks.com/laser6.htm.

Maluf, N., "Lasers: A Tutorial", New Focus, Opticon 2001, San Jose, CA, pp 1–48.

* cited by examiner

METHOD AND APPARATUS FOR TUNING A LASER WITH A BRAGG GRATING IN A SEMICONDUCTOR SUBSTRATE

RELATED APPLICATION

This application is a continuation-in-part of co-pending application Ser. No. 09/881,218, filed Jun. 13, 2001, entitled "METHOD AND APPARATUS FOR TUNING A BRAGG GRATING IN A SEMICONDUCTOR SUBSTRATE," and assigned to the Assignee of the present application.

BACKGROUND OF THE INVENTION

1. Field of the Invention

The present invention relates generally to optical devices and, more specifically, the present invention relates to tunable lasers.

2. Background Information

The need for fast and efficient optical-based technologies is increasing as Internet data traffic growth rate is overtaking voice traffic pushing the need for fiber optical communications. Transmission of multiple optical channels over the same fiber in the dense wavelength-division multiplexing (DWDM) system provides a simple way to use the unprecedented capacity (signal bandwidth) offered by fiber optics. Commonly used optical components in the system include WDM transmitters and receivers, optical filters such as diffraction gratings, thin-film filters, fiber Bragg gratings, arrayed-waveguide gratings, optical add/drop multiplexers, and tunable lasers.

Lasers are well known devices that emit light through stimulated emission and produce coherent light beams with a frequency spectrum ranging from infrared to ultraviolet and may be used in a vast array of applications. For example, in optical communications or networking applications, semiconductor lasers may be used to produce light or optical beams used on which data or other information may be encoded and transmitted.

Other devices used in optical communications or networking applications are fiber-based Bragg gratings. A fiber Bragg grating is an optical fiber device that includes an optical fiber with periodic changes in the refractive index of fiber core materials along the fiber length, which may be formed by exposure of the photosensitive core to an intense optical interference pattern. With the changes in the refractive index along the fiber length, optical beams at a particular wavelength are reflected by the fiber Bragg grating while other wavelengths are allowed to propagate through the fiber.

A limitation with fiber Bragg gratings is that the particular wavelength that is reflected by the fiber Bragg grating is substantially fixed. Consequently, if different wavelengths of light are to be reflected, different fiber Bragg gratings are utilized. In some known fiber Bragg gratings, nominal adjustments to the reflected wavelength may be provided by physically or mechanically stretching the optical fiber of the fiber Bragg grating to modify the length of the optical fiber. The disadvantage of this technique is that the amount of adjustment to the reflected wavelength is relatively small and the optical fiber may suffer damage from the physical stress and strain of the stretching.

BRIEF DESCRIPTION OF THE DRAWINGS

The present invention is illustrated by way of example and not limitation in the accompanying figures.

DETAILED DESCRIPTION

Methods and apparatuses for tuning a laser disposed in a semiconductor substrate are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Tunable lasers capable of changing output wavelengths are very useful in the DWDM systems. The tunable laser could be set to any desired wavelength, and this would eliminate the need to keep a hundred or so specific wavelength distributed-feedback (DFB) lasers. Lasing wavelength tuning can be realized either by changing the resonant cavity (for example, external cavity diode lasers) or with tunable filters acting as cavity mirrors (for example, sampled grating distributed Bragg reflector lasers).

In one embodiment of the present invention, a semiconductor-based tunable laser is provided in a fully integrated solution on a single integrated circuit chip. In the various embodiments described herein, tunable lasers are provided with single or multiple outputs having single or multiple output wavelengths. In one embodiment, the output wavelength of the tunable laser is tuned by shifting the center wavelength of a semiconductor-based tunable Bragg grating. The tunable Bragg grating works as at least one of the reflectors forming the laser cavity of the tunable laser. Embodiments of the presently described tunable laser can be used as a building block in applications including for example broadband optical networking systems or the like.

Figure 1:
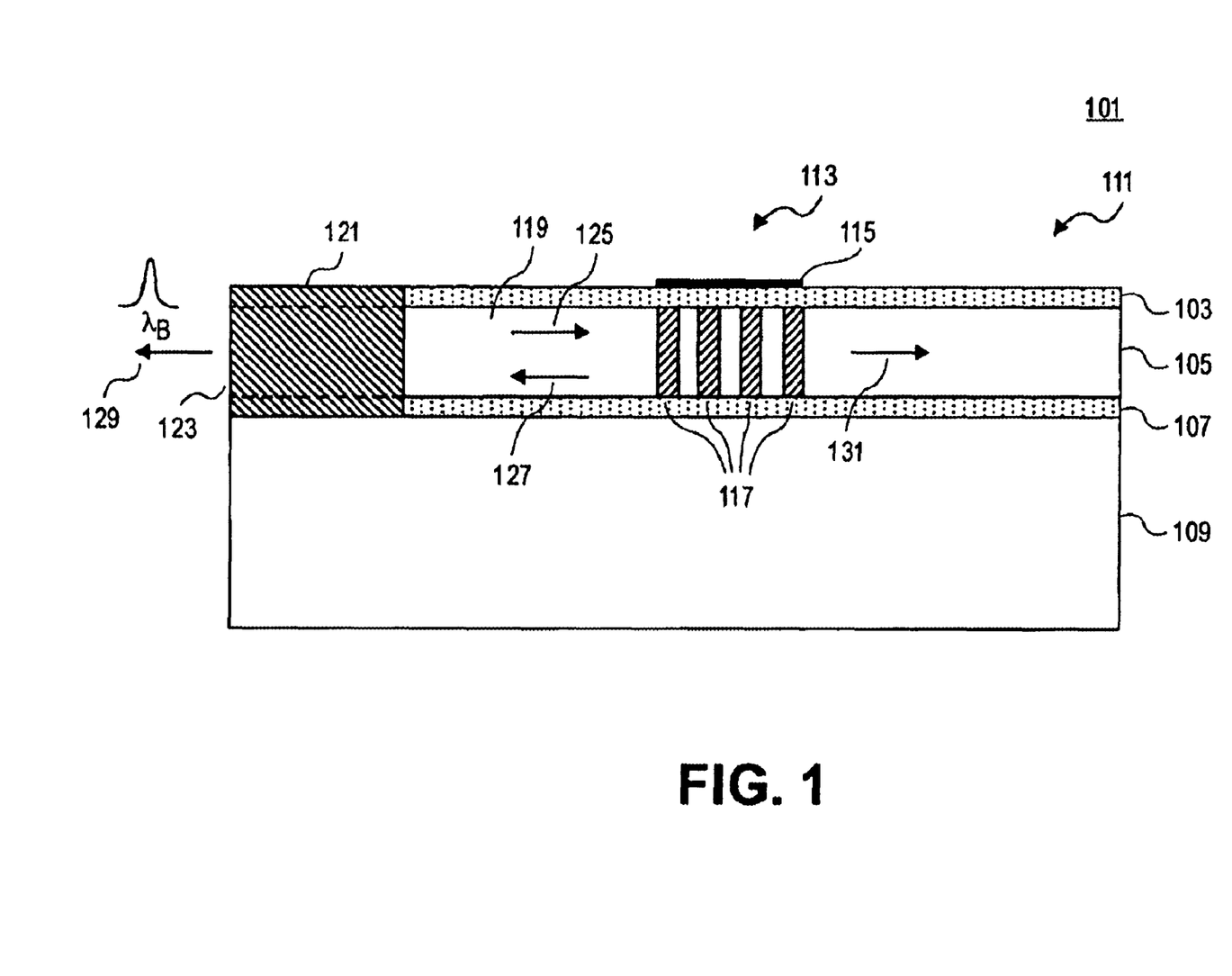
FIG. 1 is a block diagram illustrating one embodiment of a tunable laser in accordance with the teachings of the present invention.

To illustrate, FIG. 1 is a block diagram illustrating one embodiment of a tunable laser 101 in accordance with the teachings of the present invention. As shown, one embodiment of tunable laser 101 is disposed on a silicon-on-insulator (SOI) wafer 111 including a semiconductor substrate 105 and a semiconductor substrate 109. In one embodiment, semiconductor substrate 105 includes silicon. An insulating layer 107 is disposed between semiconductor substrates 105 and 109. Semiconductor substrate 105 is disposed between and insulating layer 103 and insulating layer 107.

As illustrated in the depicted embodiment, tunable laser 101 also includes a gain medium 121 and a tunable Bragg grating 113 disposed in semiconductor substrate 105. In one embodiment, gain medium 121 includes for example an InP diode that includes a cleaved surface or facet forming a reflector 123 of tunable laser 101. As will be discussed in greater detail below, one embodiment of tunable Bragg grating 113 is formed with a multi-layer structure including alternating regions of polysilicon 117 and semiconductor substrate 105. A thermal heater 115 is disposed as shown proximate to alternating the polysilicon and semiconductor substrate regions 105 to locally adjust the temperature of the semiconductor substrate 105 and polysilicon regions 117 so as to adjust the tunable wavelength of tunable Bragg grating 113.

In one embodiment, a laser cavity 119 is defined in semiconductor substrate 105 between insulating layers 103 and 107 and between reflector 123 of gain medium 121 and tunable Bragg grating 113. As will be discussed in greater detail below, one embodiment of laser cavity 119 is included in gain medium 121 and a waveguide formed in semiconductor substrate 105 between reflector 123 and tunable Bragg grating 113. In one embodiment, tunable Bragg grating 113 acts as a reflector to selectively reflect light at the tunable wavelength of tunable Bragg grating 113.

In operation, electricity is first converted into light in laser cavity 119 with gain medium 121. As can be appreciated to those skilled in the art, this light may be created in the laser cavity 119 by for example current injection in semiconductors (gain media) to create electron-hole pairs such that light is produced through electron-hole radiative recombination processes. This light is illustrated in FIG. 1 as optical beam 125 emanating from gain medium 121 in laser cavity 119. In one embodiment, tunable Bragg grating 113 reflects portions of optical beam 125 having a tunable center wavelength equal to the Bragg wavelength $\lambda_B$. This reflected portion having the tunable center wavelength equal to $\lambda_B$ is illustrated in FIG. 1 as optical beam 127. The remaining portions or wavelengths included in optical beam 125 not reflected by tunable Bragg grating 113 are illustrated in FIG. 1 as optical beam 131 continuing past tunable Bragg grating 113. Optical beams 125 and 127 continue to reflect back and forth between reflector 123 and tunable Bragg grating 113 such that lasing, or the amplification of stimulated emission of light, occurs in laser cavity 119.

In one embodiment, since the reflection spectrum of tunable Bragg grating 113 has a narrow bandwidth of, for example, <1 nm, the lasing or stimulated emission of light in laser cavity 119 is achieved only in a narrow frequency range. In one embodiment, reflector 123 is only partially reflective such that optical beam 129 is output through the reflector 123 of tunable laser 101. Stated differently, optical beam 129 is tuned to a wavelength of $\lambda_B$ because tunable Bragg grating 113 is tuned to reflect light having a wavelength $\lambda_B$. In one embodiment, the tunable center wavelength of tunable Bragg grating 113 may be tuned or adjusted to tune or adjust the wavelength of optical beam 129.

Figure 2:
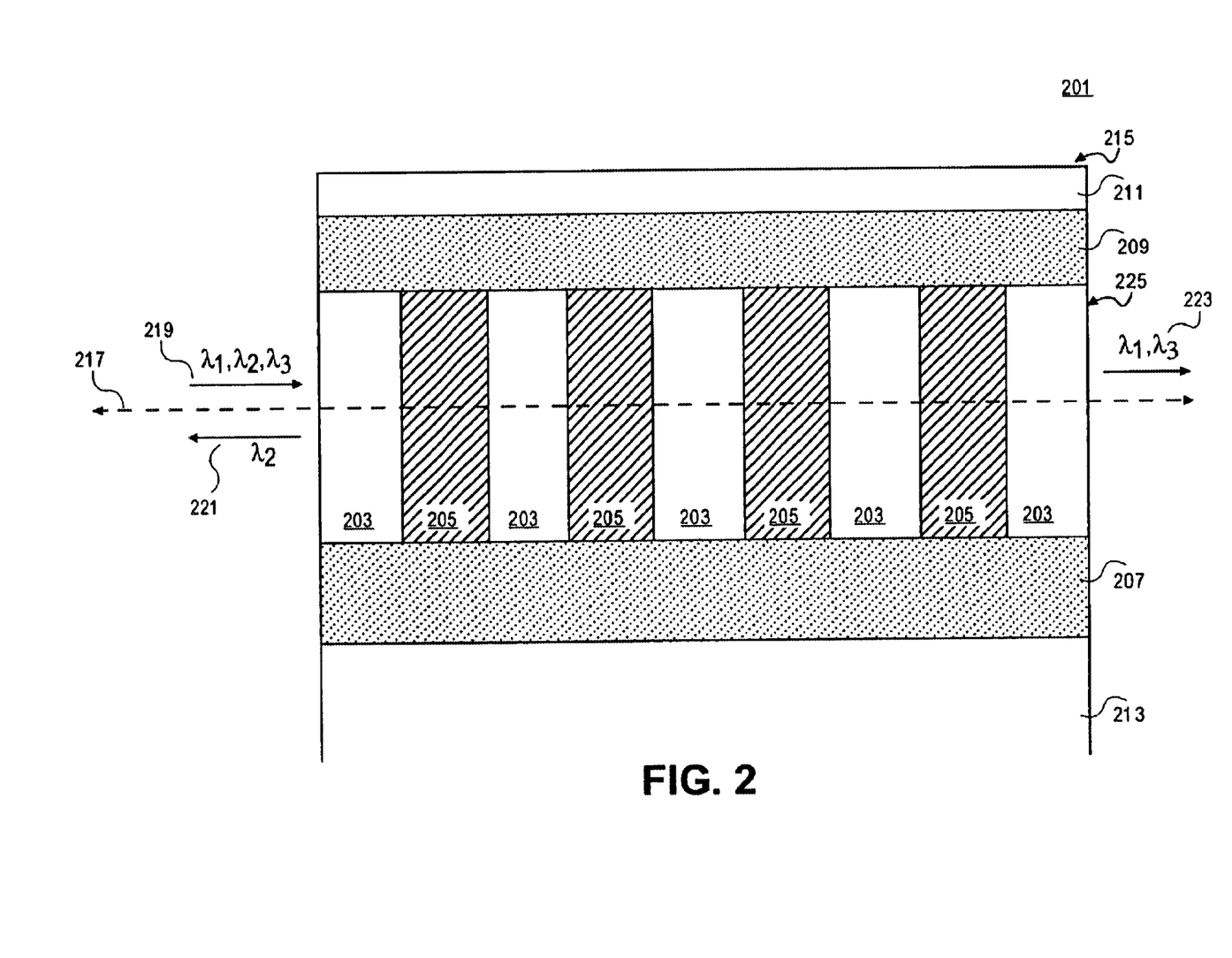
FIG. 2 is a block diagram illustrating a cross section of one embodiment of a tunable Bragg grating disposed in a semiconductor substrate including a heater utilized in a tunable laser in accordance with the teachings of the present invention.

FIG. 2 is a block diagram illustrating a cross section showing greater detail of one embodiment of a semiconductor-based tunable Bragg grating 201 disposed in a semiconductor substrate 203 in accordance with the teachings of the present invention. In one embodiment, tunable Bragg grating 201 may be used in place of tunable Bragg grating 113 of FIG. 1. In the depicted embodiment, Bragg grating 201 of FIG. 2 is silicon/polysilicon grating. It is appreciated that silicon and polysilicon are example materials provided for explanation purposes and that other semiconductor materials including III–V semiconductor materials or the like may be utilized in accordance with the teachings of the present invention. As shown, a plurality of regions of polysilicon 205 are disposed in a silicon semiconductor substrate 203 such that periodic or quasi-periodic perturbations in an effective index of refraction $n_{\mathit{eff}}$ are provided along an optical path 217 through semiconductor substrate 203.

In one embodiment in which silicon and polysilicon are utilized, having effective refractive indexes of $n_{Si}$ and $n_{poly}$, respectively, a small effective refractive index difference $\Delta n_{\mathit{eff}}$ (or $n_{poly} - n_{Si}$) is provided at each interface between semiconductor substrate 203 and polysilicon 205. In one embodiment, $\Delta n_{\mathit{eff}}$ is approximately within the range of 0.005 to 0.03. It is appreciated that other value ranges for $\Delta n_{\mathit{eff}}$ may be utilized in accordance with the teachings of the present invention and that 0.005 to 0.03 is provided herewith for explanation purposes.

As illustrated in FIG. 2, semiconductor substrate 203 is included in one embodiment in an SOI wafer 215. As such, an insulating layer 207 or a buried oxide layer is disposed between semiconductor substrate 203 layer and another semiconductor substrate layer 213. In one embodiment, an additional insulating layer 209 is included such that semiconductor substrate 203 layer is disposed between insulating layers 207 and 209. In one embodiment, insulating layer 209 is an interlayer dielectric layer of the SOI wafer 215. In one embodiment, insulating layers 207 and 209 include an oxide material or the like. As a result, a waveguide 225 including optical path 217 is provided in semiconductor substrate 203 with cladding provided by insulating layers 207 and 209.

Figure 3:
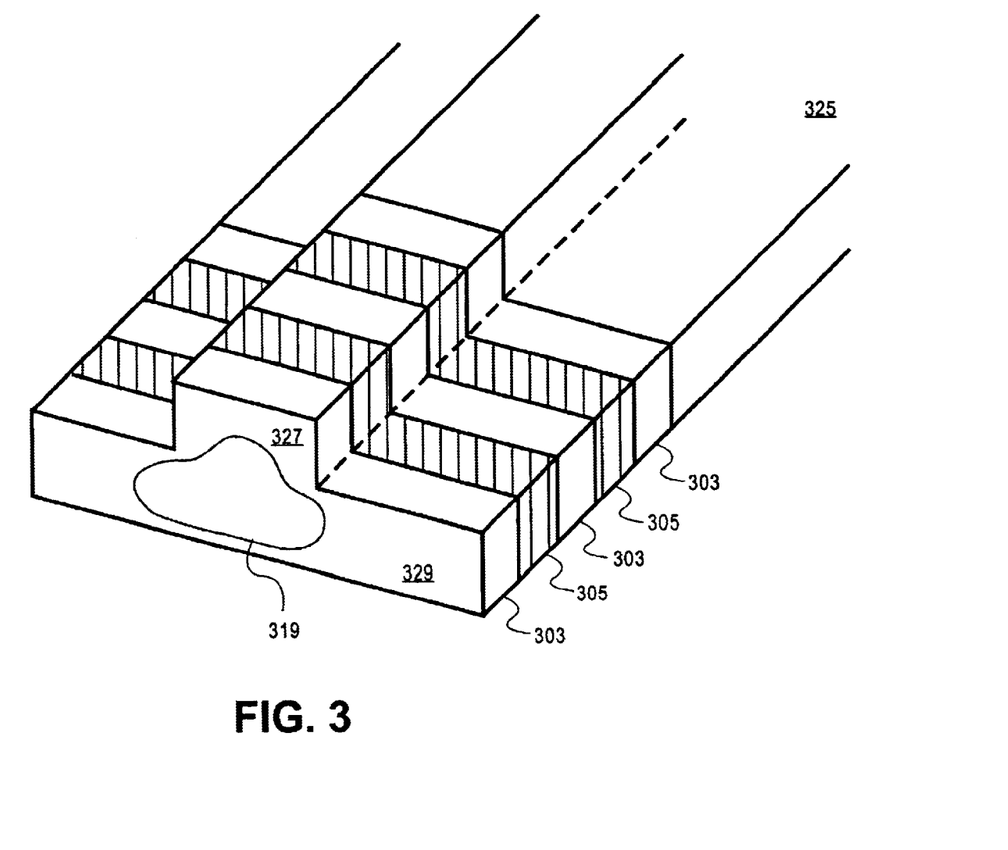
FIG. 3 is a perspective diagram illustrating one embodiment of a tunable Bragg grating disposed in a semiconductor substrate including a rib waveguide disposed in a semiconductor substrate utilized in a tunable laser in accordance with the teachings of the present invention.

In one embodiment, waveguide 225 is a rib waveguide. To illustrate, FIG. 3 is a perspective view illustration of one embodiment of a rib waveguide 325 of a tunable Bragg grating in accordance with the teachings of the present invention. In one embodiment, rib waveguide 225 is disposed between insulating regions 207 and 209 of SOI wafer 215 of FIG. 2.

Referring back to FIG. 3, rib waveguide 325 is disposed in a semiconductor substrate 303 and includes regions of polysilicon 305. In one embodiment, the semiconductor substrate 303 has a different index of refraction than polysilicon 305 such that periodic or quasi-periodic perturbations in an effective index of refraction are provided along an optical path through rib waveguide 325.

As shown, the rib waveguide 325 includes a rib region 327 and a slab region 329. In the embodiment illustrated in FIG. 3, the intensity distribution of a single mode optical beam 319 is shown propagating through the rib waveguide 325. As shown, the intensity distribution of optical beam 319 is such that of the majority of the optical beam 319 propagates through a portion of rib region 327 towards the interior of the rib waveguide 325. In addition, a portion of optical beam 319 propagates through a portion of slab region 329 towards the interior of the rib waveguide 325. As also shown with the intensity distribution of optical beam 319, the intensity of the propagating optical mode of beam 319 is vanishingly small at the "upper corners" of rib region 327 as well as the "sides" of slab region 329.

Referring back to the illustration in FIG. 2, an optical beam 219 is directed along optical path 217 into one end of waveguide 225. In one embodiment, optical beam 219 includes infrared or near infrared light and is confined with cladding provided by insulating layers 207 and 209 to remain within waveguide 225 along optical path 217 between the ends of waveguide 225. In one embodiment, optical beam 219 is confined as a result of total internal reflection since the oxide material of insulating layers 207 and 209 has a smaller index of refraction than the semiconductor material of semiconductor substrate 203 and polysilicon 205.

In one embodiment, optical beam 219 includes a plurality of channels having wavelengths including for example $\lambda_1$, $\lambda_2$ and $\lambda_3$. It is appreciated that although optical beam 219 has been illustrated to include three wavelengths $\lambda_1$, $\lambda_2$ and $\lambda_3$ in the illustrated example, a different number of wavelengths may be included in optical beam 219 in accordance with the teachings of the present invention.

As mentioned above, there are periodic or quasi-periodic perturbations in the effective index of refraction along optical path 217 through waveguide 225. As a result of the effective refractive index difference $\Delta n_{eff}$ described above, a multiple reflection of optical beam 219 occurs at the interfaces between semiconductor substrate 203 and polysilicon 205 along optical path 217. In one embodiment, a Bragg reflection occurs when a Bragg condition or phase matching condition is satisfied. In particular, for uniform Bragg gratings, when the condition $$m\lambda_B = 2n_{eff}\Lambda, \qquad \text{(Equation 1)}$$

is satisfied, where m is the diffraction order, $\lambda_B$ is the Bragg wavelength, $n_{eff}$ is the effective index of the waveguide and $\Lambda$ is the period of the grating, a Bragg reflection occurs.

To illustrate, FIG. 2 shows a Bragg condition existing for $\lambda_B$ equal to $\lambda_2$. Accordingly, an optical beam 221 including wavelength $\lambda_2$ is shown to be reflected back out of the waveguide 225 out from the end into which optical beam 219 is directed. In addition, the remainder of optical beam 219 continues to propagate along optical path 217 through waveguide 225 such that the remaining wavelengths (e.g. $\lambda_1$ and $\lambda_3$) are included the an optical beam 223, which is propagated from the opposite end of waveguide 225. Accordingly, the Bragg wavelength $\lambda_2$ is filtered or dropped from optical beam 223. In one embodiment, optical beam 219 may be an optical communications beam or the like on which data is encoded. In one embodiment, wave division multiplexing (WDM) or dense wave division multiplexing (DWDM) or the like maybe employed with optical beam 219 such that a different channel is encoded with each of the wavelengths (e.g. $\lambda_1$, $\lambda_2$, $\lambda_3$, etc.) included in optical beam 219.

In one embodiment, the Bragg wavelength, $\lambda_B$, that is reflected or filtered by tunable Bragg grating 201 is tunable or adjustable with a heater 211 disposed proximate to waveguide 225. In an embodiment, heater 211 includes a thin-film heater or the like or other future arising technology that controls the temperature of semiconductor substrate 203 and polysilicon 205 in waveguide 225 along optical path 217. For instance, silicon and polysilicon have large index of refraction variations with temperature on the order of approximately $2 \times 10^{-4}/°$ K. It is appreciated that the index of refraction variations with temperature for semiconductor materials such as silicon and/or polysilicon are two orders of magnitude greater than other materials such as for example silica or the like. Thus, by controlling the temperature of semiconductor substrate 203 and polysilicon 205, relatively significant shifts in the center wavelength of light reflected by a tunable Bragg grating 201 are provided in accordance with the teachings of the present invention.

Figure 4:
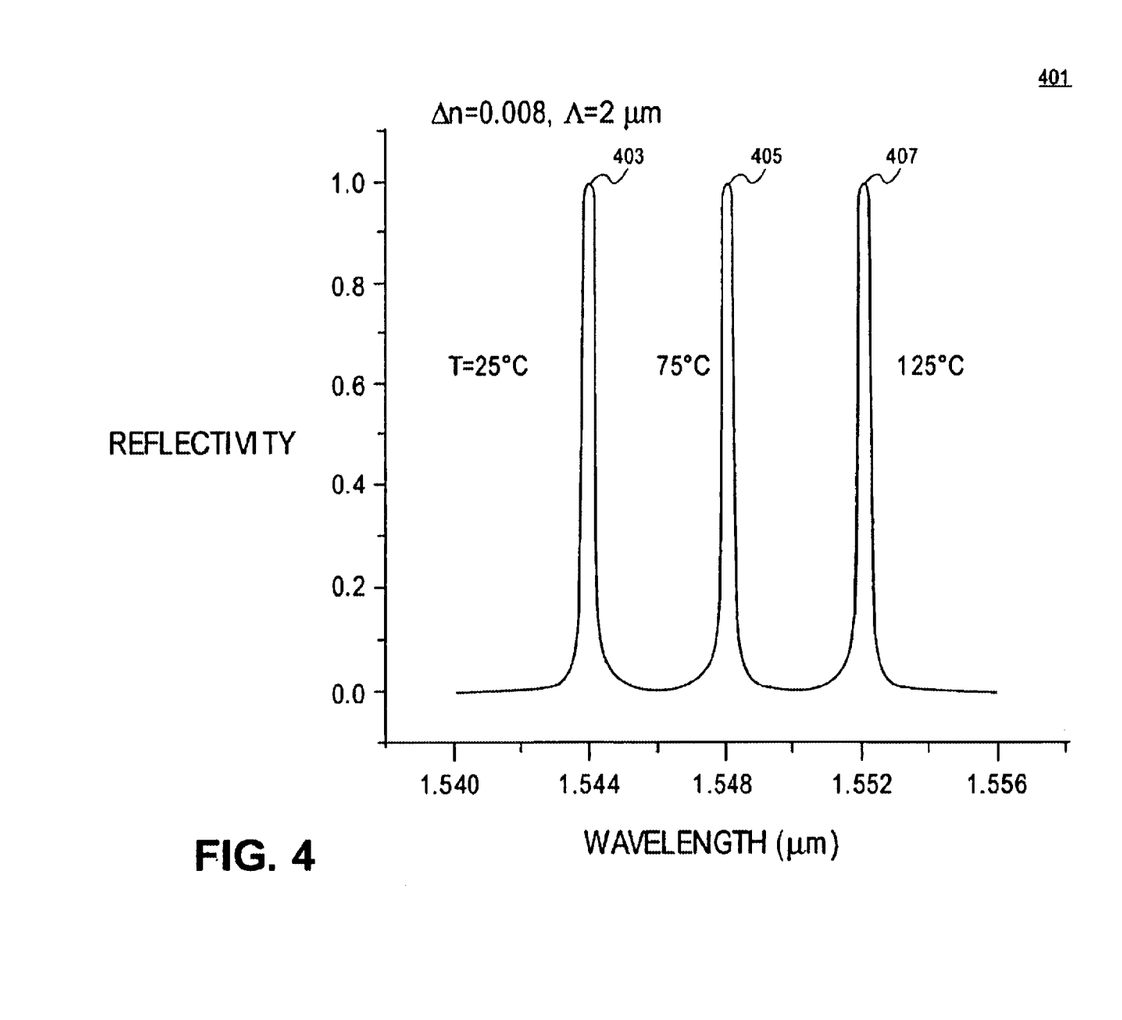
FIG. 4 is a diagram illustrating the relationship between reflectivity and wavelength at different temperatures of one embodiment of a tunable Bragg grating utilized in a tunable laser in accordance with the teachings of the present invention.

To illustrate, FIG. 4 is a diagram 401 illustrating the relationship between reflectivity and wavelength at different temperatures of one embodiment of a tunable Bragg grating 201 in accordance with the teachings of the present invention. In the illustrated example, heater 211 is used to adjust the temperature of silicon/polysilicon waveguide Bragg grating to 25° C., 75° C. and 125° C. In the illustrated embodiment, the difference in the effective indexes of refraction between the silicon and polysilicon $\Delta n_{eff}$ is approximately 0.008 and the period of the grating $\Lambda$ is approximately 2 $\mu$m.

Plot 403 shows that at 25° C., the center wavelength of an optical beam that is reflected by the silicon/polysilicon waveguide Bragg grating is approximately 1.544 $\mu$m in the illustrated embodiment. In comparison, plot 405 shows that at 75° C., the center wavelength of an optical beam that is reflected is shifted or tuned to be approximately 1.548 $\mu$m, while plot 407 shows that at 125° C., the center wavelength of an optical beam that is reflected is shifted or tuned to be approximately 1.552 $\mu$m. In one embodiment, a thin-film heater utilized for heater 211 provides center wavelength tuning speeds in the order of microseconds.

It is appreciated of course that the materials, dimensions, wavelengths and index of refraction values utilized in the embodiment illustrated in FIG. 4 are provided for explanation purposes and that other materials, dimensions, wavelengths and index of refraction values may be utilized in accordance with the teachings of the present invention.

Figure 5A:
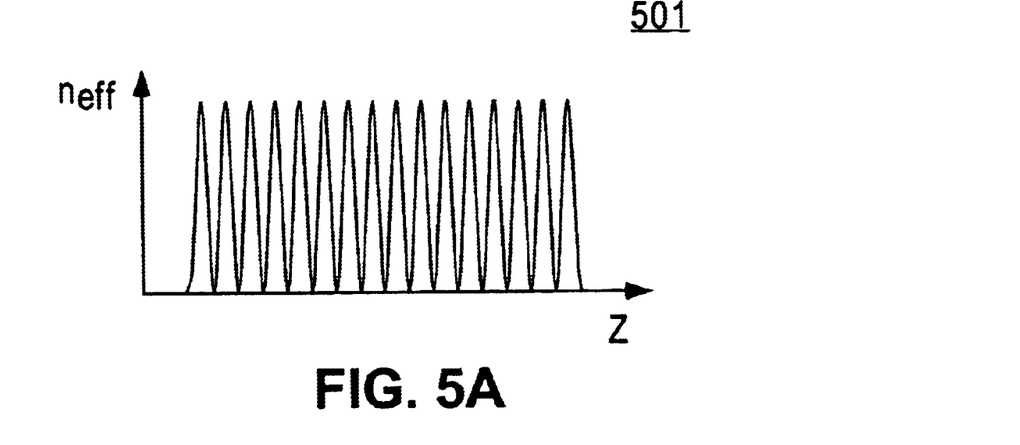
FIG. 5A is a diagram illustrating the effective index of refraction along an optical path of one embodiment of a tunable uniform Bragg grating utilized in a tunable laser in accordance with the teachings of the present invention.

In one embodiment, there are sidelobes on the sides of each maxima of plots 403, 405 and 407. When uniform or periodic Bragg gratings are utilized, the sidelobes are usually relatively large. An example of a uniform grating with periodic perturbations in the effective index of refraction along the optical path of the Bragg grating is illustrated in diagram 501 in FIG. 5A. As shown along the y-axis, the effective index of refraction $n_{eff}$ is perturbed periodically or regularly down the optical path, which shown as Z along the x-axis of diagram 501.

Figure 5B:
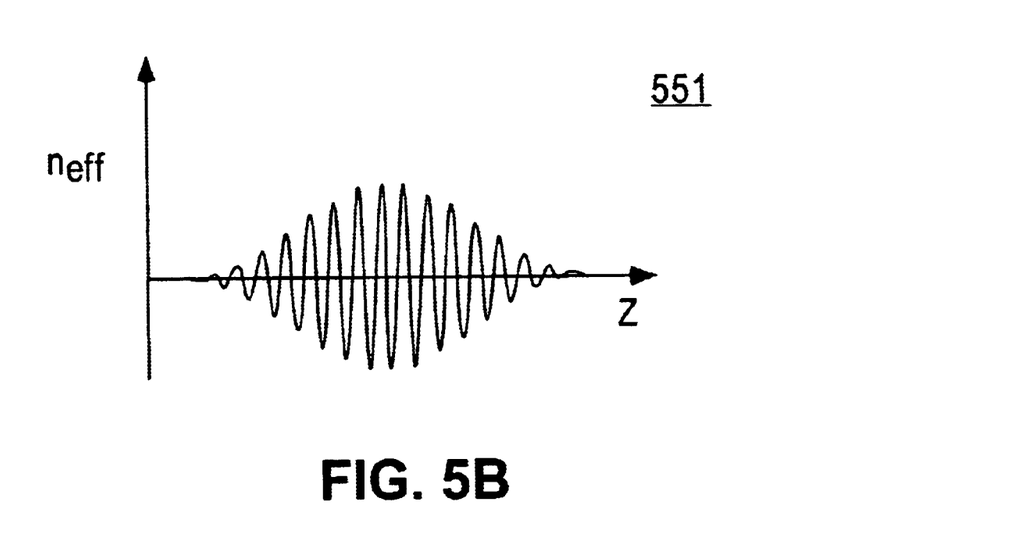
FIG. 5B is a diagram illustrating the effective index of refraction along an optical path of one embodiment of a tunable apodized Bragg grating utilized in a tunable laser in accordance with the teachings of the present invention.

In one embodiment, an apodized Bragg grating is provided in accordance with the teachings of the present invention, which reduces the sidelobes on the sides of each maxima of plots 403, 405 and 407. One embodiment of an apodized grating utilized in accordance with the teachings of the present invention is illustrated in diagram 551 of FIG. 5B. An apodized grating is provided with quasi-periodic perturbations in the effective index of refraction along the optical path of the Bragg grating. The perturbation in the effective index of refraction can be realized by either changing refractive index of constitutive materials or varying layer widths (duty cycle) along the Bragg grating. It is noted that an embodiment of a raised-cosine apodized grating is illustrated in diagram 551 of FIG. 5B. It is appreciated that other types of apodized gratings may be utilized in accordance with the teachings of the present invention including but not limited to Gaussian-apodized, chirped, discrete phase shift, superstructure or the like.

Figure 6:
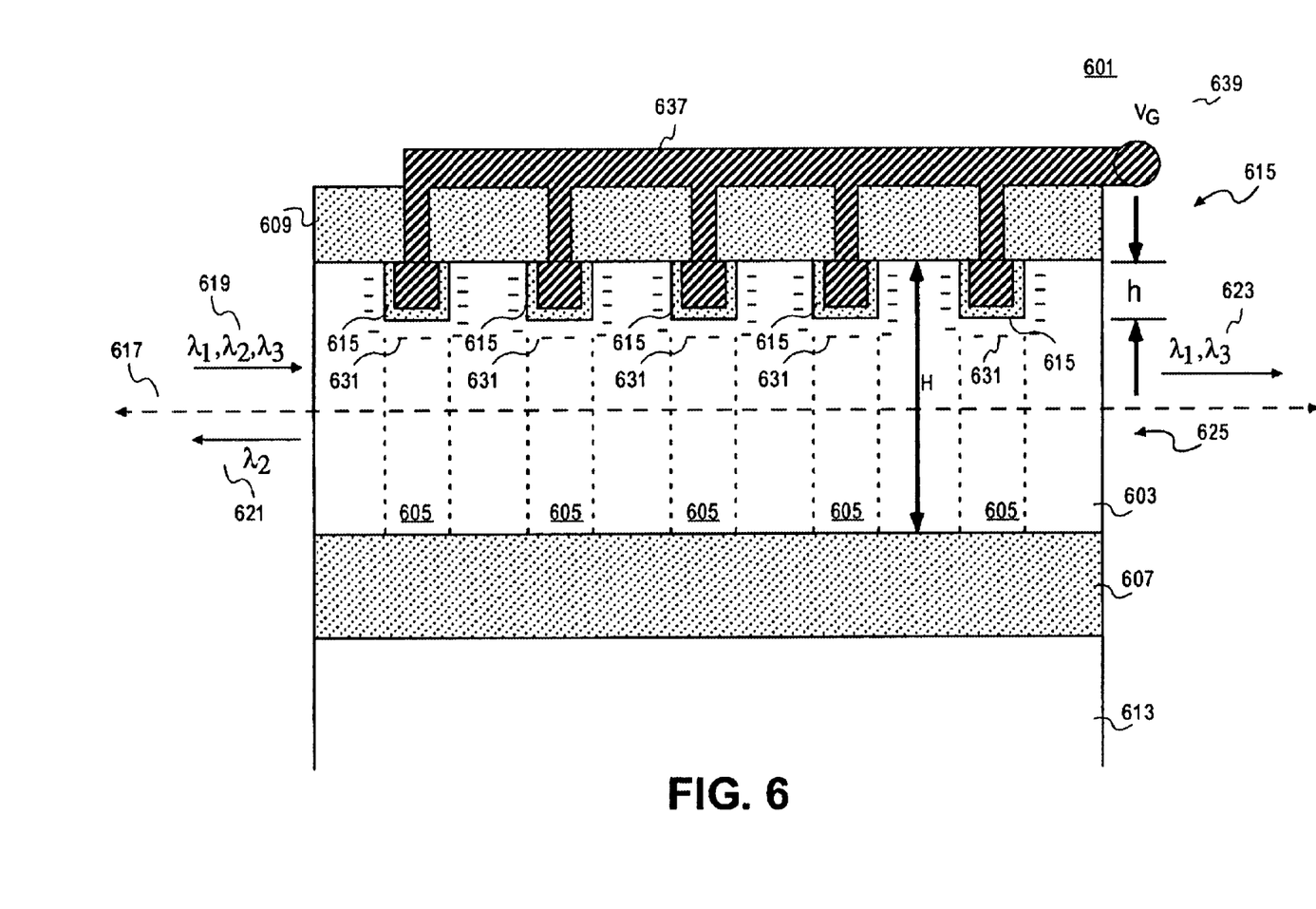
FIG. 6 is a block diagram illustrating a cross section of another embodiment of a tunable Bragg grating disposed in a semiconductor substrate including charge modulated regions utilized in a tunable laser in accordance with the teachings of the present invention.

FIG. 6 is a block diagram illustrating a cross section of another embodiment of a tunable Bragg grating 601 in accordance with the teachings of the present invention. It is appreciated that tunable Bragg grating 601 may also be utilized in place of tunable Bragg grating 113 of FIG. 1 in accordance with the teachings of the present invention. As shown in the depicted embodiment, tunable Bragg grating 601 includes a semiconductor substrate 603 having an optical path 617 through which an optical beam 619 is directed. In one embodiment, semiconductor substrate 603 is included in an SOI wafer 615 such that semiconductor substrate 603 is disposed between a buried insulating layer 607 and insulating layer 609. In addition, buried insulating layer 607 is disposed between semiconductor substrate layer 603 and semiconductor substrate layer 613. In one embodiment, an optical waveguide 625 is provided with semiconductor substrate 603 with insulating layers 607 and 609 serving as cladding to confine optical beam 619 to remain within waveguide 625 between the ends.

In the embodiment depicted in FIG. 6, tunable Bragg grating 601 is provided with trenched silicon structures. In particular, a plurality of conductor-insulator-semiconductor structures 615, similar to for example metal-oxide-semiconductor (MOS) structures, are disposed along optical path 617 in semiconductor substrate 603. Each structure 615 is coupled to receive a modulation signal $V_G$ 639 through conductor 637, which is coupled to each structure 615 through insulating layer 609. As shown in FIG. 6, the height of each structure 615 in waveguide 625 is h. In one embodiment, the height h of the structures 615 is chosen such that propagation loss of optical beam 617 in waveguide 625 along optical path 617 is acceptable.

In the embodiment depicted in FIG. 6, periodic or quasi-periodic perturbations in an effective index $n_{eff}$ of refraction are provided along an optical path 617 through waveguide 625 in semiconductor substrate 603. In particular, the effective index of refraction $n_{eff}$ is related or equal to a function of the geometry of waveguide 625 along optical path 617 as well as the index of refraction of the specific medium (e.g. $n_{Si}$) and the wavelength λ included in optical beam 619.

Accordingly, assuming semiconductor substrate 603 includes silicon, the effective index of refraction $n_{eff}$ is a function of the height H of waveguide 625 not including structures 615, $n_{Si}$ and λ. In the regions 605 of waveguide 625 including structures 615, the effective index of refraction $n'_{eff}$ is a function of the height (H-h) of waveguide 625 including structures 615, $n_{Si}$ and λ. Thus, the difference in effective index of refraction $$\Delta n_{eff} = n_{eff} - n'_{eff}.$$ (Equation 2)

In the depicted embodiment, structures 615 are biased in response to modulation signal $V_G$ 639 through conductor 637 such that the concentration of free charge carriers in charge modulated regions 631 in the semiconductor substrate layer 603 proximate to the structures 615. For example, assuming a positive voltage is applied with modulation signal $V_G$ 639 through conductor 637, electrons in semiconductor substrate 603 are swept into charge modulated regions 631. When for example less positive voltage is applied to conductor 637, the concentration of free charge carriers swept into charge modulated regions 631 is reduced.

It is noted that for explanation purposes, charge modulated regions 631 have been illustrated to include negative charge. It is appreciated that in another embodiment, the polarities of these charges and the voltages of modulation signal $V_G$ 639 may be reversed in accordance with the teachings of the present invention.

In one embodiment, the effective index of refraction $n_{eff}$ in charge modulated regions 631 is modulated in response to the modulation signal $V_G$ 639 due to the plasma optical effect. The plasma optical effect arises due to an interaction between the optical electric field vector and free charge carriers that may be present along the optical path 617 of the optical beam 619. The electric field of the optical beam 619 polarizes the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. In the case of the plasma optical effect in silicon, the effective change in the index of refraction $\Delta n_{eff}$ due to the free electron ($\Delta N_e$) and hole ($\Delta N_h$) concentration change is given by:

$$\Delta n_{eff} = -\frac{e^2\lambda^2}{8\pi^2c^2\varepsilon_0 n_0}\left(\frac{\Delta N_e}{m_e^*} + \frac{\Delta N_h}{m_h^*}\right)$$ (Equation 3)

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively.

It is noted that tunable Bragg grating 601 has been illustrated in FIG. 6 with five structures 615. It is appreciated that in other embodiments, tunable Bragg grating 601 may include a greater or fewer number of structures 615 in accordance with the teachings of the present invention.

In operation, optical beam 619 is directed along optical path 617 into one end of waveguide 625. In one embodiment, optical beam 619 includes infrared or near infrared light and is confined with insulating layers 607 and 609 to remain within waveguide 625 along optical path 617 between the ends of waveguide 625. In one embodiment, optical beam 619 is confined as a result of total internal reflection since the oxide material of insulating layers 607 and 609 has a smaller index of refraction than the semiconductor material of semiconductor substrate 603.

In one embodiment, optical beam 619 includes a plurality of channels corresponding to wavelengths including for example $\lambda_1$, $\lambda_2$ and $\lambda_3$. As a result of the effective refractive index difference $\Delta n_{eff}$ described above in the periodic or quasi-periodic perturbations in the effective index of refraction along optical path 617, a multiple reflection of optical beam 619 occurs when a Bragg condition or phase matching condition is satisfied, as described above in Equation 1.

To illustrate, FIG. 6 shows a Bragg condition existing for $\lambda_B$ equal to $\lambda_2$. Accordingly, an optical beam 621 having a center wavelength $\lambda_2$ is shown to be reflected back out of the waveguide 625 out from the end into which optical beam 619 is directed. In addition, the remainder of optical beam 619 continues to propagate along optical path 617 through waveguide 525 such that the remaining wavelengths (e.g. $\lambda_1$ and $\lambda_3$) are included the an optical beam 623, which is propagated from the opposite end of waveguide 625. Accordingly, the Bragg wavelength $\lambda_2$ is filtered or dropped from optical beam 623.

In one embodiment, the center wavelength that is reflected or filtered by tunable Bragg grating 601 is tunable or adjustable by appropriately modulating charge in modulated charge regions 631 with modulation signal $V_G$ 639 to adjust the conditions for the Bragg wavelength $\lambda_B$. Indeed, as discussed above, the difference in effective refractive index $\Delta n_{eff}$ along optical path 617 is modulated in response to modulation signal $V_G$ 639 to tune the Bragg wavelength $\lambda_B$ that is reflected or filtered by tunable Bragg grating 601 in accordance with the teachings of the present invention.

Figure 7:
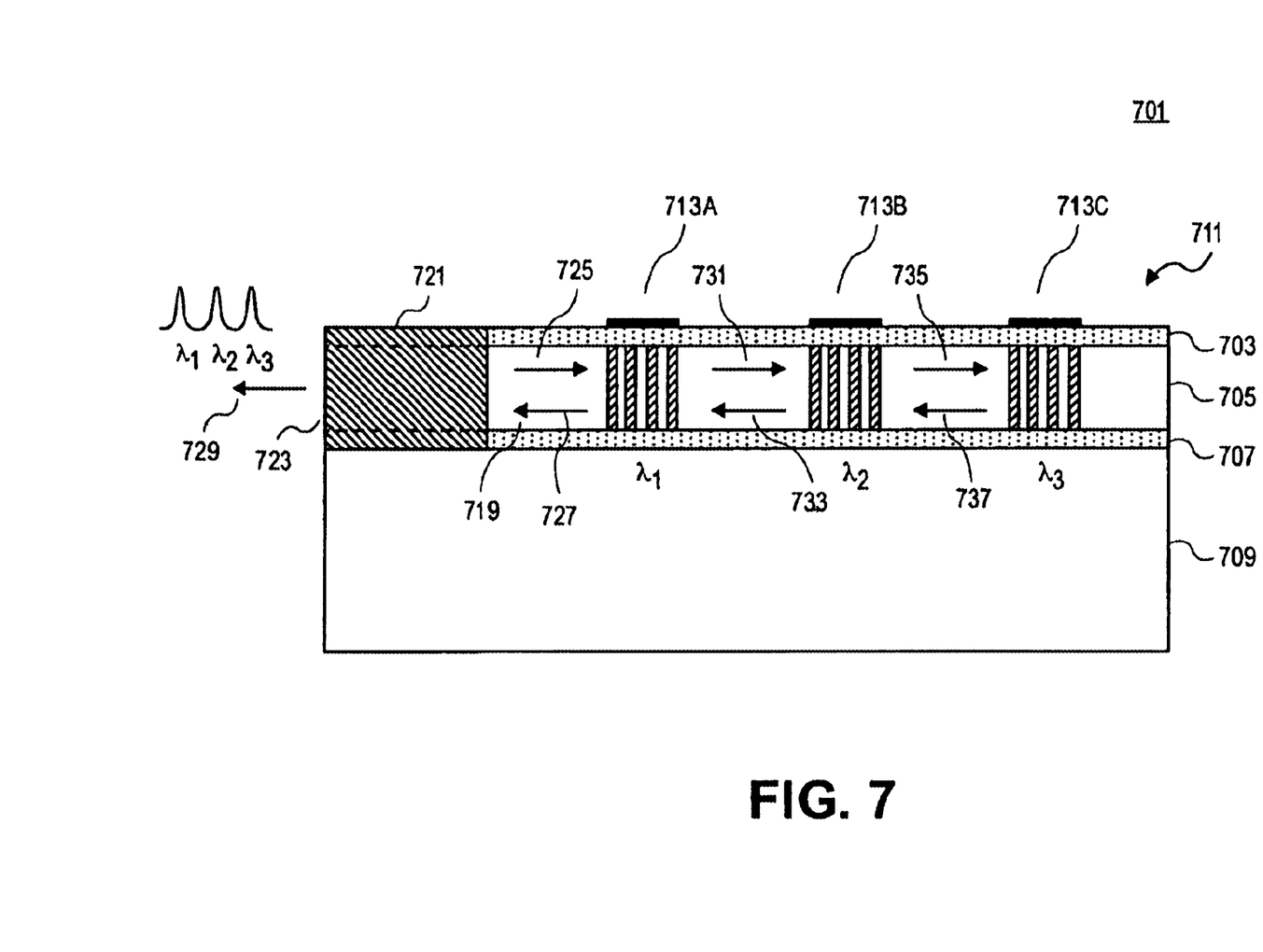
FIG. 7 is a block diagram illustrating another embodiment of a tunable laser in accordance with the teachings of the present invention.

FIG. 7 is a block diagram illustrating another embodiment of a tunable laser 701 in accordance with the teachings of the present invention. As shown, one embodiment of tunable laser 701 is disposed on an SOI wafer 711 including a semiconductor substrate 705 and a semiconductor substrate 709. An insulating layer 707 is disposed between semiconductor substrates 705 and 709. Semiconductor substrate 705 is disposed between insulating layer 703 and insulating layer 707.

As illustrated in the depicted embodiment, tunable laser 701 also includes a gain medium 721 and a plurality of tunable Bragg gratings 713A, 713B and 713C disposed in semiconductor substrate 705. As can be appreciated in the depicted embodiment, tunable laser 701 shares some similarities with tunable laser 101 with a difference including that tunable laser 701 includes a plurality of tunable Bragg gratings 713A, 713B and 713C. It is appreciated that although tunable laser 701 is illustrated in FIG. 7 including three tunable Bragg gratings, other embodiments may include a greater or fewer number of tunable Bragg gratings. In one embodiment, gain medium 721 includes for example an InP diode or the like that includes a cleaved surface or facet forming a reflector 723 of tunable laser 701. In one embodiment, a plurality of cascaded Bragg gratings including tunable Bragg gratings 713A, 713B and 713C collectively have a tunable range that covers the full spectrum of gain medium 721 (e.g. an InP diode). In one embodiment, a laser cavity 719 is defined in semiconductor substrate 705 between insulating layers 703 and 707 and between reflector 723 of gain medium 121 and the reflectors provided by the plurality of tunable Bragg gratings 713A, 713B and 713C.

In one embodiment, each of the plurality of Bragg gratings 713A, 713B and 713C may be tuned to have different Bragg wavelengths $\lambda_1$, $\lambda_2$ and $\lambda_3$, respectively. In one embodiment, Bragg gratings 713A, 713B and 713C act as a reflector to selectively reflect light having the wavelengths $\lambda_1$, $\lambda_2$ and $\lambda_3$. In operation, light is generated from gain medium 721, shown for example as optical beam 725. The portion of optical beam 725 having a center wavelength of $\lambda_1$ is reflected from tunable Bragg grating 713A. The reflected portion is illustrated as optical beam 727. The remaining portion is shown as optical beam 731, which continues through laser cavity 719 to tunable Bragg grating 713B. The portion of optical beam 731 having a center wavelength of $\lambda_2$ is reflected from tunable Bragg grating 713B. The reflected portion is illustrated as optical beam 733. The remaining portion is shown as optical beam 735, which continues through laser cavity 719 to tunable Bragg grating 713C. The portion of optical beam 735 having a center wavelength of $\lambda_3$ is reflected from tunable Bragg grating 713C. The reflected portion is illustrated as optical beam 737. Optical beams 725, 727, 731, 733, 735 and 737 continue to reflect back and forth between reflector 723 and tunable Bragg gratings 713A, 713B and 713C as described such that lasing or the stimulated emission of light occurs in laser cavity 719 in the narrow frequency ranges centered around $\lambda_1$, $\lambda_2$ and $\lambda_3$.

In one embodiment, reflector 723 is only partially reflective such that optical beam 729 is output through the reflector 723 of tunable laser 701. As shown, optical beam 729 is tuned to include simultaneously wavelength components of $\lambda_1$, $\lambda_2$ and $\lambda_3$ because tunable Bragg gratings 713A, 713B and 713C are tuned to reflect light having a wavelengths $\lambda_1$, $\lambda_2$ and $\lambda_3$, respectively. In one embodiment, the tunable center wavelengths of tunable Bragg gratings 713A, 713B and 713C maybe tuned or adjusted to tune or adjust the wavelength components included simultaneously in optical beam 729.

Figure 8:
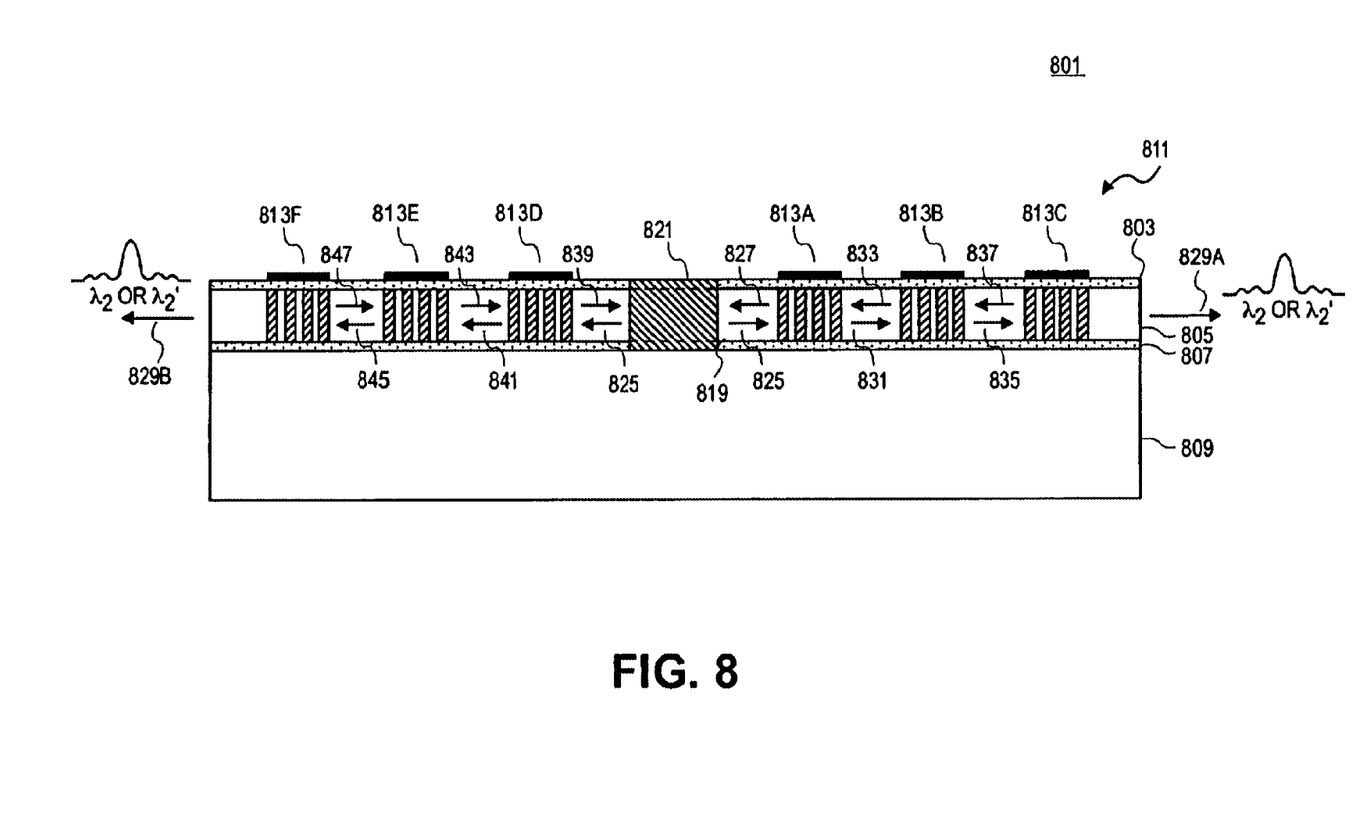
FIG. 8 is a block diagram illustrating yet another embodiment of a tunable laser in accordance with the teachings of the present invention.

FIG. 8 is a block diagram illustrating yet another embodiment of a tunable laser 801 in accordance with the teachings of the present invention. In one embodiment, tunable laser 801 has two optical outputs as well as an increased range of output wavelengths compared to tunable laser 101 of FIG. 1. As shown in FIG. 8, one embodiment of tunable laser 801 is disposed on an SOI wafer 811 including a semiconductor substrate 805 and a semiconductor substrate 809. An insulating layer 807 is disposed between semiconductor substrates 805 and 809. Semiconductor substrate 805 is disposed between and insulating layer 803 and insulating layer 807.

As illustrated in the depicted embodiment, tunable laser 801 also includes a gain medium 821 disposed between a plurality of tunable Bragg gratings 813A, 813B and 813C and 813E, 813F and 813G disposed in semiconductor substrate 805. As can be appreciated in the depicted embodiment, tunable laser 801 shares some similarities with tunable laser 701 with a difference including that tunable laser 801 includes gain medium 821 being disposed between a plurality of tunable Bragg gratings. It is appreciated that although tunable laser 801 is illustrated in FIG. 8 including three pairs of tunable Bragg gratings, other embodiments may include a greater or fewer number of tunable Bragg gratings. In one embodiment, a gain medium 821 includes for example an Inp diode. In one embodiment, a laser cavity 819 is defined in semiconductor substrate 805 between insulating layers 803 and 807 and between reflectors provided by the plurality of tunable Bragg gratings 813A, 813B and 813C on one end and the reflectors provided by the plurality of tunable Bragg gratings 813E, 813F and 813G on the other end.

In one embodiment, each of the plurality of tunable Bragg gratings 813A, 813B and 813C may be tuned to have different Bragg wavelengths $\lambda_1$, $\lambda_2$ and $\lambda_3$, respectively. The plurality of tunable Bragg gratings 813E, 813F and 813G may also be tuned to have different Bragg wavelengths $\lambda_1'$, $\lambda_2'$ and $\lambda_3'$, respectively. In one embodiment, Bragg gratings 813A, 813B and 813C and 813E, 813F and 813G act as reflectors to reflect light having the wavelengths $\lambda_1$, $\lambda_2$, $\lambda_3$, $\lambda_1'$, $\lambda_2'$ and $\lambda_3'$. In one embodiment, one of the Bragg wavelengths $\lambda_1$, $\lambda_2$ or $\lambda_3$ is tuned to match or be equal to one of the Bragg wavelengths $\lambda_1'$, $\lambda_2'$ and $\lambda_3'$. The rest of the Bragg wavelengths $\lambda_1$, $\lambda_2$ or $\lambda_3$ are tuned not to be equal to any of the remaining ones of the Bragg wavelengths $\lambda_1'$, $\lambda_2'$ and $\lambda_3'$.

For explanation purposes only, assume in an illustration that $\lambda_2=\lambda_2'$ and that $\lambda_1 \neq \lambda_1'$ and that $\lambda_3 \neq \lambda_3'$. In operation, light is generated from gain medium 821, shown for example as optical beam 825 being directed towards tunable Bragg gratings 813A, 813B and 813C and tunable Bragg gratings tunable Bragg gratings 813E, 813F and 813G.

The portion of optical beam 825 having a center wavelength of $\lambda_1$ is reflected from tunable Bragg grating 813A. The reflected portion is illustrated as optical beam 827. The remaining portion is shown as optical beam 831, which continues through laser cavity 819 to tunable Bragg grating 813B. The portion of optical beam 831 having a center wavelength of $\lambda_2$ is reflected from tunable Bragg grating 813B. The reflected portion is illustrated as optical beam 833. The remaining portion is shown as optical beam 835, which continues through laser cavity 819 to tunable Bragg grating 813C. The portion of optical beam 835 having a center wavelength of $\lambda_3$ is reflected from tunable Bragg grating 813C. The reflected portion is illustrated as optical beam 837.

The portion of optical beam 825 having a center wavelength of $\lambda_1'$ is reflected from tunable Bragg grating 813D. The reflected portion is illustrated as optical beam 839. The remaining portion is shown as optical beam 841, which continues through laser cavity 819 to tunable Bragg grating 813E. The portion of optical beam 841 having a center wavelength of $\lambda_2'$ is reflected from tunable Bragg grating 813E. The reflected portion is illustrated as optical beam 843. The remaining portion is shown as optical beam 845, which continues through laser cavity 819 to tunable Bragg grating 813F. The portion of optical beam 845 having a center wavelength of $\lambda_3'$ is reflected from tunable Bragg grating 813D. The reflected portion is illustrated as optical beam 847.

Since $\lambda_2$ has been tuned to be equal to $\lambda_2'$ in the described example, the portions of optical beams 825, 827, 831, 833, 835, 837, 839, 841, 843, 845 and 847 having wavelengths equal to $\lambda_2$ or $\lambda_2'$ continue to reflect back and forth between the correspondingly tuned tunable Bragg gratings as described such that lasing or the stimulated emission of light occurs in laser cavity 819 in the narrow frequency ranges centered around $\lambda_2$ or $\lambda_2'$. Accordingly, optical beams 829A and 829B are output from the ends of laser cavity 819 as shown with tuned wavelengths equal to $\lambda_2$ or $\lambda_2'$. It is appreciated that any presence of $\lambda_1$, $\lambda_1'$, $\lambda_3$ or $\lambda_3'$ wavelength components in optical beams 829A and 829B appear merely as small lobes since wavelengths $\lambda_1$, $\lambda_1'$, $\lambda_3$ or $\lambda_3'$ are not equal to each other. However, in one embodiment the tunable center wavelengths of tunable Bragg gratings 813A, 813B, 813C, 813D, 813E and 813F maybe tuned or adjusted such that $\lambda_1=\lambda_1'$ or $\lambda_3=\lambda_3'$ or $\lambda_2 \neq \lambda_2'$. Therefore, optical beams 829A and 829B in one embodiment may be tuned to wavelengths within the entire spectrum of Bragg wavelengths to which tunable Bragg gratings 813A, 813B and 813C and tunable Bragg gratings 813E, 813F and 813G may be tuned. In one embodiment, tunable Bragg gratings 813A, 813B and 813C and tunable Bragg gratings 813E, 813F and 813G may be tuned to cover the full spectrum of gain medium 821.

In another embodiment, a single grating G1 (not shown) can be used to reflect multiple wavelengths $\lambda_1$, $\lambda_2$ and $\lambda_3$ instead of separate gratings 813A, 813B and 813C, since a single grating has multiple diffraction orders. Similarly a second grating, G2 of slightly different pitch can be used to reflect $\lambda_1'$, $\lambda_2'$ and $\lambda_3'$ and replace the separate gratings 813E, 813F and 813G. In this embodiment, one of the Bragg orders or Bragg wavelengths of Bragg grating G1 is tuned to match or be equal one of the Bragg orders or Bragg wavelengths of Bragg grating of G2. This then works in exactly the same way as having multiple gratings as illustrated in FIG. 8 except now the reflections at different Bragg wavelengths are coming from single gratings rather than separate gratings.

Figure 9:
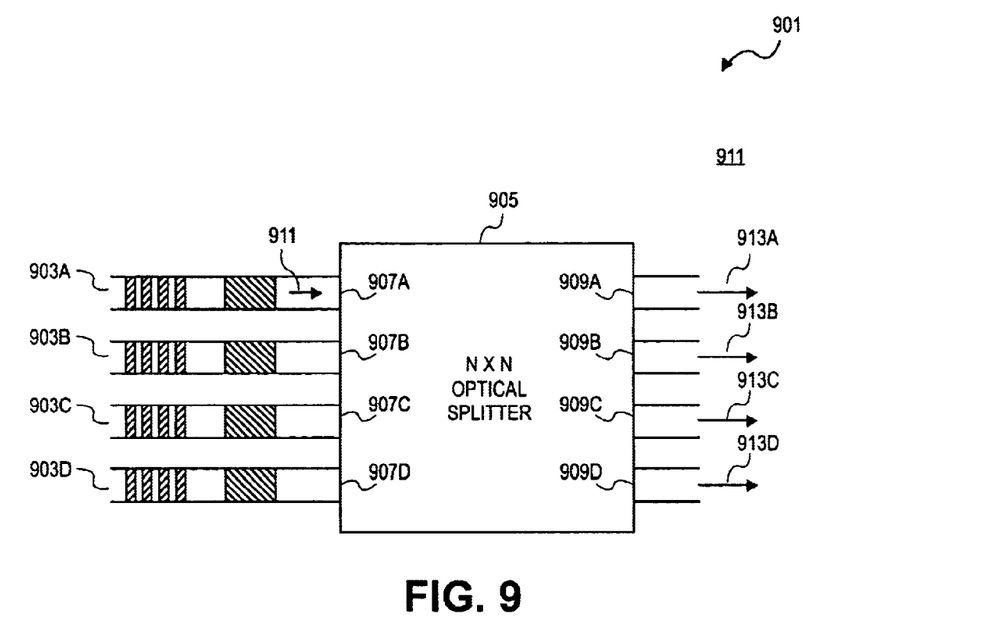
FIG. 9 is a block diagram illustrating still another embodiment of a tunable laser in accordance with the teachings of the present invention.

FIG. 9 is a block diagram illustrating still another embodiment of a multi-output tunable laser 901 in accordance with the teachings of the present invention. In one embodiment, multi-output tunable laser 901 has a plurality of optical outputs as well as an increased range of output wavelengths compared to tunable laser 101 of FIG. 1. As shown in FIG. 9, one embodiment of multi-output tunable laser 901 includes a semiconductor wafer 911 on which a plurality of tunable lasers 903A, 903B, 903C and 903D are included. In one embodiment, each of tunable lasers 903A, 903B, 903C and 903D are similar to tunable laser 101 shown in FIG. 1. It is appreciated that in other embodiments, tunable lasers 903A, 903B, 903C and 903D may be similar to tunable laser 701 or tunable laser 801 in accordance with the teachings of the present invention. It is also appreciated that although four tunable lasers 903A, 903B, 903C and 903D are illustrated in FIG. 9 for explanation purposes, multi-output tunable laser 901 may include a greater or fewer number of tunable lasers in accordance with the teachings of the present invention.

As shown in FIG. 9, an optical splitter 905 that disposed in wafer 911 is also included in multi-output tunable laser 901. In one embodiment, optical splitter 905 is an N×N multi-mode interference (MMI) optical splitter having N optical inputs 907A, 907B, 907C and 907D and N optical outputs 913A, 913B, 913C and 913D. Each of the optical outputs 913A, 913B, 913C and 913D are optically coupled to each of the optical inputs 907A, 907B, 907C and 907D. Accordingly, an optical beam received at optical input 907A is split N-ways and output at each of the optical outputs 913A, 913B, 913C and 913D. An optical beam received at optical input 907B is split N-ways and output at each of the optical outputs 913A, 913B, 913C and 913D. An optical beam received at optical input 907C is split N-ways and output at each of the optical outputs 913A, 913B, 913C and 913D. An optical beam received at optical input 907D is split N-ways and output at each of the optical outputs 913A, 913B, 913C and 913D.

As shown in the depicted embodiment, each of the optical inputs 907A, 907B, 907C and 907D are optically coupled to receive a corresponding optical beam output from one of the tunable lasers 903A, 903B, 903C and 903D, respectively. In the example illustrated in FIG. 9, tunable laser is shown to output optical beam 911, which is received at optical input 907A and is split N-ways and output at optical outputs 909A, 909B, 909C and 909D, respectively, as optical beams 913A, 913B, 913C and 913D, respectively.

In operation, only one of the tunable lasers 903A, 903B, 903C and 903D of multi-output tunable laser 901 is turned on or enabled to output an optical beam at a time. The received optical beam is split N-ways and is output at all N optical outputs. In addition, each one of the tunable lasers 903A, 903B, 903C and 903D may have a different range of tunable wavelength optical beams that may be generated. Accordingly, one embodiment of multi-output tunable laser 901 has the capability to generate output optical beams 913 at any wavelength to which any one of tunable lasers 903A, 903B, 903C or 903D may be tuned.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A laser apparatus, comprising:
   a gain medium disposed in a semiconductor substrate;
   a laser cavity disposed in the semiconductor substrate, the laser cavity optically coupled to the gain medium;
   a first reflector defining one end of the laser cavity, the first reflector including a first tunable Bragg grating disposed in the semiconductor substrate, the first tunable Bragg grating including a first plurality of silicon and polysilicon interfaces along the semiconductor substrate such that there is a first plurality of perturbations of a refractive in index along the first tunable Bragg grating, the first tunable Bragg grating to selectively reflect light having a tunable center wavelength so as to emit light through stimulated emission having the tunable center wavelength in the laser cavity; and
   a second reflector defining an other end of the laser cavity.

2. The apparatus of claim 1 further comprising a heater disposed proximate to the semiconductor substrate including the first tunable Bragg grating, wherein a temperature of the semiconductor substrate including the first tunable Bragg grating is responsive to the heater, wherein the tunable center wavelength is responsive to the temperature of the semiconductor substrate.

3. The apparatus of claim 1 wherein the laser cavity comprises a rib waveguide disposed in the semiconductor substrate.

4. The apparatus of claim 1 wherein the first tunable Bragg grating is one of a first plurality of tunable Bragg gratings disposed in the semiconductor substrate cascaded along the laser cavity, each of the first plurality of tunable Bragg gratings having different tunable center wavelengths, each of the first plurality of tunable Bragg gratings defining the end of the laser cavity at their respective different tunable center wavelengths.

5. The apparatus of claim 1 wherein the second reflector includes a second Bragg grating disposed in the semiconductor substrate such that there is a second plurality of perturbations of a refractive index along the second tunable Bragg grating, the second tunable Bragg grating to selectively reflect light having the tunable center wavelength so as to emit light through stimulated emission having the tunable center wavelength in the laser cavity.

6. The apparatus of claim 5 wherein the first tunable Bragg grating is one of a first plurality of tunable Bragg gratings disposed in the semiconductor substrate cascaded along the laser cavity, each of the first plurality of tunable Bragg gratings having different tunable center wavelengths, each of the first plurality of tunable Bragg gratings defining the end of the laser cavity at their respective different tunable center wavelengths,
   wherein the second tunable Bragg grating is one of a second plurality of tunable Bragg gratings disposed in the semiconductor substrate cascaded along the laser cavity, each of the second plurality of tunable Bragg gratings having different tunable center wavelengths, each of the second plurality of tunable Bragg gratings defining the other end of the laser cavity at their respective different tunable center wavelengths.

7. The apparatus of claim 6 wherein one of the first plurality of tunable Bragg gratings and one of the second plurality of tunable Bragg gratings are tuned to have substantially equal respective tunable center wavelengths, wherein remaining ones of the first plurality of tunable Bragg gratings and remaining ones of the second plurality of tunable Bragg gratings are tuned not to have substantially equal respective tunable center wavelengths.

8. The apparatus of claim 5 wherein the tunable center wavelength is one of a first plurality of wavelengths that the first tunable Bragg grating is to reflect, wherein the tunable center wavelength is one of a second plurality of wavelengths that the second tunable Bragg grating is to reflect, wherein remaining ones of the first plurality of wavelengths are not equal to remaining ones of the second plurality of wavelengths.

9. The apparatus of claim 1 further comprising an optical splitter disposed in the semiconductor substrate, the optical splitter having a first optical input optically coupled to the other end of the laser cavity, the optical splitter having a plurality of optical outputs, each of the plurality of optical outputs optically coupled to the first optical input of the optical splitter.

10. The apparatus of claim 9 wherein the optical splitter includes a plurality of optical inputs including the first optical input, wherein each of the plurality of optical inputs is optically coupled to a corresponding one of a plurality of tunable lasers disposed in the semiconductor substrate.

11. The apparatus of claim 10 wherein the optical splitter includes an N×N multi-mode interference (MMI) device disposed in the semiconductor substrate.

12. A laser apparatus, comprising:
   a gain medium disposed in a semiconductor substrate;
   a laser cavity disposed in the semiconductor substrate, the laser cavity optically coupled to the gain medium;
   a first reflector defining a first end of the laser cavity, the first reflector including a first tunable Bragg grating disposed in the semiconductor substrate, the first tunable Bragg grating including a plurality of insulated conductor structures protruding into the laser cavity to produce charge modulated regions to induce a plurality of corresponding perturbations of a refractive index along the semiconductor substrate, the first tunable Bragg grating to selectively reflect light having a tunable center wavelength so as to emit light through stimulated emission having the tunable center wavelength in the laser cavity; and
   a second reflector defining an other end of the laser cavity.

13. The apparatus of claim 12 wherein a charge concentration in the charge modulated region is adjusted in response to a modulation signal so as to adjust the tunable center wavelength.

14. The apparatus of claim 12 wherein the laser cavity comprises a rib waveguide disposed in the semiconductor substrate.

15. The apparatus of claim 14 wherein the first tunable Bragg grating is one of a first plurality of tunable Bragg gratings disposed in the semiconductor substrate cascaded along the laser cavity, each of the first plurality of tunable Bragg gratings having different tunable center wavelengths, each of the first plurality of tunable Bragg gratings defining the other end of the laser cavity at their respective different tunable center wavelengths.

16. The apparatus of claim 12 wherein the second reflector includes a second tunable Bragg grating disposed in the semiconductor substrate such that there is a second plurality of perturbations of a refractive index along the second tunable Bragg grating, the second tunable Bragg grating to selectively reflect light having the tunable center wavelength so as to emit light through stimulated emission having the tunable center wavelength in the laser cavity.

17. The apparatus of claim 16 wherein the first tunable Bragg grating is one of a first plurality of tunable Bragg gratings disposed in the semiconductor substrate cascaded along the laser cavity, each of the first plurality of tunable Bragg gratings having different tunable center wavelengths, each of the first plurality of tunable Bragg gratings defining the end of the laser cavity at their respective different tunable center wavelengths, wherein the second tunable Bragg grating is one of a second plurality of tunable Bragg gratings disposed in the semiconductor substrate cascaded along the laser cavity, each of the second plurality of tunable Bragg gratings having different tunable center wavelengths, each of the second plurality of tunable Bragg gratings defining the other end of the laser cavity at their respective different tunable center wavelengths.

18. The apparatus of claim 17 wherein one of the first plurality of tunable Bragg gratings and one of the second plurality of tunable Bragg gratings are tuned to have substantially equal respective tunable center wavelengths, wherein remaining ones of the first plurality of tunable Bragg gratings and remaining ones of the second plurality of tunable Bragg gratings are tuned not to have substantially equal respective tunable center wavelengths.

19. The apparatus of claim 16 wherein the tunable center wavelength is one of a first plurality of wavelengths that the first tunable Bragg grating is to reflect, wherein the tunable center wavelength is one of a second plurality of wavelengths that the second tunable Bragg grating is to reflect, wherein remaining ones of the first plurality of wavelengths are not equal to remaining ones of the second plurality of wavelengths.

20. The apparatus of claim 12 further comprising an optical splitter disposed in the semiconductor substrate, the optical splitter having a first optical input optically coupled to the other end of the laser cavity, the optical splitter having a plurality of optical outputs, each of the plurality of optical outputs optically coupled to the first optical input of the optical splitter.

21. The apparatus of claim 20 wherein the optical splitter includes an N×N multi-mode interference (MMI) device disposed in the semiconductor substrate, the optical splitter having N optical inputs including the first optical input, the optical splitter having N optical outputs including the plurality of optical outputs.

22. A method for operating a laser, comprising:
stimulating emission of light from a gain medium in a laser cavity disposed in a semiconductor substrate;
reflecting the emitted light having a tunable center wavelength from an end of the laser cavity so as to further stimulate emission of light having the tunable center wavelength in the laser cavity, wherein the emitted light having the tunable center wavelength is reflected from the end of the laser cavity with a first tunable Bragg grating including a plurality of silicon and polysilicon interfaces along the semiconductor substrate such that there are a plurality of perturbations of a refractive index along the Bragg grating; and
reflecting the emitted light from an other end of the laser cavity.

23. The method of claim 22 further comprising adjusting a temperature of the semiconductor substrate including the first tunable Bragg grating wherein the tunable center wavelength is responsive to the temperature of the semiconductor substrate.

24. The method of claim 22 wherein reflecting the emitted light having the tunable center wavelength from the end of the laser cavity comprises reflecting the emitted light having the tunable center wavelength from one of a first plurality of tunable Bragg gratings disposed in the semiconductor substrate cascaded along the laser cavity, wherein the first tunable Bragg grating is one of the first plurality of tunable Bragg gratings, each of the first plurality of tunable Bragg gratings having different tunable center wavelengths.

25. The method of claim 24 wherein reflecting the emitted light from the other end of the laser cavity comprises reflecting the emitted light having the tunable center wavelength from one of a second plurality of tunable Bragg gratings disposed in the semiconductor substrate cascaded along the laser cavity, each of the second plurality of tunable Bragg gratings having different tunable center wavelengths.

26. The method of claim 25 further comprising:
tuning one of the first plurality of tunable Bragg gratings and one of the second plurality of tunable Bragg gratings to reflect light having the tunable center wavelength; and
tuning remaining ones of the first plurality of tunable Bragg gratings and remaining ones of the second plurality of tunable Bragg gratings to different tunable center wavelengths.

27. The method of claim 22 further comprising:
selectively directing the emitted light into an optical splitter disposed in the semiconductor substrate; and
splitting the emitted light directed into the optical splitter into a plurality of optical beams output from the optical splitter.

28. A method for operating a laser, comprising:
stimulating emission of light from a gain medium in a laser cavity disposed in a semiconductor substrate;
reflecting the emitted light having a tunable center wavelength from an end of the laser cavity so as to further stimulate emission of light having the tunable center wavelength in the laser cavity, wherein the emitted light having the tunable center wavelength is reflected from the end of the laser cavity with a first tunable Bragg grating including a plurality of insulated conductor structures protruding into the laser cavity to produce charge modulated regions to induce a plurality of corresponding perturbations of a refractive index along the semiconductor substrate; and
reflecting the emitted light from an other end of the laser cavity.

29. The method of claim 28 further comprising adjusting a charge concentration in the charge modulated regions of the first tunable Bragg grating so as to adjust the tunable center wavelength.

30. The method of claim 28 wherein reflecting the emitted light having the tunable center wavelength from the end of the laser cavity comprises reflecting the emitted light having the tunable center wavelength from one of a first plurality of tunable Bragg gratings disposed in the semiconductor substrate cascaded along the laser cavity, wherein the first tunable Bragg grating is one of the first plurality of tunable Bragg gratings, each of the first plurality of tunable Bragg gratings having different tunable center wavelengths.

31. The method of claim 30 wherein reflecting the emitted light from the other end of the laser cavity comprises reflecting the emitted light having the tunable center wavelength from one of a second plurality of tunable Bragg gratings disposed in the semiconductor substrate cascaded along the laser cavity, each of the second plurality of tunable Bragg gratings having different tunable center wavelengths.

32. The method of claim 31 further comprising:

tuning one of the first plurality of tunable Bragg gratings and one of the second plurality of tunable Bragg gratings to reflect light having the tunable center wavelength; and tuning remaining ones of the first plurality of tunable Bragg gratings and remaining ones of the second plurality of tunable Bragg gratings to different tunable center wavelengths.

33. The method of claim 28 further comprising:

selectively directing the emitted light into an optical splitter disposed in the semiconductor substrate; and splitting the emitted light directed into the optical splitter into a plurality of optical beams output from the optical splitter.

* * * * *